(12) United States Patent
Harvey et al.

(10) Patent No.: US 9,836,982 B1
(45) Date of Patent: Dec. 5, 2017

(54) ENHANCING LEARNING

(71) Applicant: EMC Corporation, Hopkinton, MA (US)

(72) Inventors: Stephen G Harvey, Plympton, MA (US); Gregory W Ambulos, Needham, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 180 days.

(21) Appl. No.: 13/730,129

(22) Filed: Dec. 28, 2012

Related U.S. Application Data

(60) Provisional application No. 61/715,377, filed on Oct. 18, 2012.

(51) Int. Cl.
  *G09B 5/02* (2006.01)
  *G09B 5/00* (2006.01)

(52) U.S. Cl.
  CPC ..................... *G09B 5/00* (2013.01)

(58) Field of Classification Search
  CPC .............................................. G09B 5/02
  USPC ....................................................... 434/219
  See application file for complete search history.

(56) References Cited

U.S. PATENT DOCUMENTS

| | | | | |
|---|---|---|---|---|
| 2003/0008266 A1* | 1/2003 | LoSasso | .................. | G09B 7/02 434/118 |
| 2003/0228561 A1* | 12/2003 | Escalante | ............... | G09B 19/00 434/219 |
| 2004/0062381 A1* | 4/2004 | Shambaugh | ............ | H04M 3/51 379/265.02 |
| 2008/0120169 A1* | 5/2008 | Ward et al. | ..................... | 705/11 |
| 2008/0268418 A1* | 10/2008 | Tashner | ................... | G09B 7/00 434/365 |

OTHER PUBLICATIONS

D'Angelo, Maurissa, Analysis of Amputee Gait using Virtual Reality Rehabilitation Techniques, A dissertation submitted in partial fulfillment of the Requirements for the degree of Doctor of Philosophy at Wright University, Jun. 21, 2010.
D'Angelo, Maurissa, A Virtual Reality Environment to Assist Disabled Individuals, Virtual Rehabilitation Conference, 2007, Dayton, OH.
D'Angelo, Maurissa, Member Profile, Integrative Graduate Education and Research Traineeship.
D'Angelo, Maurissa, Fellow Research Profile, Wright State University.
National Shipbuilding Research Program, All-Panel Meeting 2013, Meeting Information Guide.
National Shipbuilding Research Program, Electrical Technologies Panel Meeting; Meeting Minutes of December Panel Meeting, Dec. 5-6, 2012, San Diego, CA.
D'Angelo, Maurissa, Virtual Reality: From Training to Rehabilitation, Penn State.

\* cited by examiner

*Primary Examiner* — Thomas Hong
(74) *Attorney, Agent, or Firm* — Krishnendu Gupta; Konrad R. Lee

(57) ABSTRACT

A system, computer implemented method, and program product comprising presenting a user with training about business processes via an interactive environment, having the user perform the training by interacting with the interactive environment, providing the user with a sales lead, having the user try to sell a product to the customer, integrating the result of the sale into the interactive environment; and revising the interactive environment based on the success or failure of the sale.

15 Claims, 11 Drawing Sheets

ENHANCING LEARNING

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to learning.

BACKGROUND

Successfully imparting information to employees and partners can be important for a business. A business may have better access to employees than to partners. It may be very important to develop training that can successfully train partners.

SUMMARY

A system, computer implemented method, and program product comprising presenting a user with training about business processes via an interactive environment, having the user perform the training by interacting with the interactive environment, providing the user with a sales lead, having the user try to sell a product to the customer, integrating the result of the sale into the interactive environment; and revising the interactive environment based on the success or failure of the sale.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
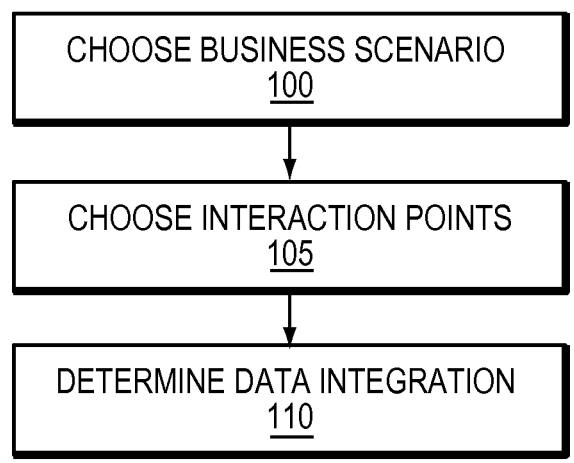
FIG. 1 is a simplified example of a method building interactive training, in accordance with an embodiment of the present disclosure.

In some embodiments, the current disclosure may enable using video games and video game mechanics to enhance technical learning. In other embodiments, this may cover training and learning conducted by customers, partners, and employees. In further embodiments, the current disclosure may enable using video games and video game mechanics to enhance Partner learning" specifically for partners. In certain embodiments, the current disclosure may enable a dynamic, virtual, and interactive learning environment using video games and video game mechanics.

In certain embodiments, the current disclosure may enable leveraging video gaming and gaming systems to enable training.

In some embodiments, the interactions between a gaming environment and real world scenarios may be used to train employees and or perspective employees. In at least one embodiment, the current disclosure may enable a participant in a game to interact with business rules. In further embodiments, the current disclosure may enable feedback between a gaming environment and the business world. In further embodiments, the gaming environment may be used to convey business information, such as sales leads to a gaming participant. In still further embodiments, the current disclosure may enable the participant to take leads from the gaming environment and use them to interact with business.

In at least one embodiment, interaction in the business or real world may be integrated into the gaming environment to influence further interaction with the gaming environment. In most embodiments, feedback from the gaming environment may be actively integrated into a participants interaction with and learning of a business environment. In at least one embodiment, successful completion of a task in a gaming environment may be fed into a business scenario to provide a business challenge to be complete. In other embodiments, successful completion of a business challenge or problem may be used to feed interactions in a business environment.

In certain embodiments, the current disclosure may enable an interactive learning environment. In some embodiments, the interactive learning environment may combine training presented in a virtual world or game to facilitate using the training to perform actions outside of the training environment such as making sales. In at least some embodiments, the interactive learning environment may present a user with learning opportunities and information that may be used outside of the learning environment to perform business related tasks.

In a particular embodiment, after the user has been presented with training on conducting a sale of a product, the user may be presented with sales leads and information about the target customer. In this embodiment, the user may use the training and sales information to pursue the customer and attempt to make a sale. In this embodiment, the result of attempting the sale may be fed back into the interactive learning environment to impact further training and sales leads.

In certain embodiments, the current disclosure may enable using video game mechanics to enhance partner learning and their ability to position and sell a business' products. In some embodiments it may be beneficial to leverage a reseller partner community to scale and grow business, reduce our cost of sales, and meet stated revenue goals over. In at least some embodiments, massive scale may be used to ramp, train, and enable partner technical and sales resources to meet objectives. In certain embodiments, the current disclosure may enable a dynamic, virtual learning environment that may be more effective and take less time to enable partner resources than current techniques. In an embodiment, using video game mechanics (badges, leveling up, digital identity, leader boards, intense competition, collaboration, virtual mentors, etc.), partners may learn a "Way" of selling in a completely new, interactive, and exciting environment.

In a first embodiment, a "game" may be a "Learn and Sell a product or service," such as an EMC product, and the object of the game is to not only learn but to sell a product or service, such as an EMC product. In this embodiment, the game, may teach partners business processes (assessments, tools, messaging, etc.) and may allow them to become part of our process—receiving and working real sales leads, building quotes and configurations, registering deals, and updating status (closed/won) in salesforce.com.

In certain embodiments, the current disclosure may enable a "tell me and I will forget, show me and I will remember, involve me and I will understand." Conventionally, research has demonstrated that video games may be compelling and highly effective as an educational tool because they are ideal for learning, wired for pleasure, and promote an exponential increase in intelligence. In certain embodiments, the "Game mechanics" may be comprised of one or more of the following features:

1. Challenges/Badges
2. Points
3. Levels
4. Leaderboards
5. Virtual goods
6. Avatars
7. Groups
8. Competition
9. Notification
10. Trivia contests
11. Rewards In some embodiments, the interactive learning environment may comprise a series of learning "games" encapsulated in a dynamic, virtual and highly interactive gaming environment. In certain embodiments, each game may be designed to teach the user about the product, market, potential customers and business processes. In certain embodiments, the overall object of a game may be to sell a product outside of the game or interactive learning environment. In an embodiment, a user (customer, partner or employee) may enter the Game via a link provided by a business and register to play the game. In certain embodiments, the user may be identified as customer, partner, or employee. In at least one embodiment, the game may ask the user a series of questions to determine their current status, whether or not they are involved with (selling) the competition, and a brief but pointed (effective) series of questions is asked to determine their experience (time) with a company's products and the user's current level of expertise (novice, beginner, intermediate, advanced).

In an embodiment, based on an initial status, the game may suggest a track for the user and may explain the experience to which they will be presented, what the challenges are, what learning will take place, and what the rewards are. In certain embodiments, the explanation may be accomplished with highly interactive and visually interesting graphics and a map (follow the yellow brick road) that depicts what will occur (the entire process) and the potential prizes along the way. In at least one embodiment, for novices and beginners, the experience may be to win a game and may expose the user to highly interactive, challenging, and interesting product learning about EMC's unified storage product—the VNX. In some embodiments, there may be three levels to each game and several learning modules or games within the game. In many embodiments, the game may enable the user to learn storage basics, common applications and their impact on storage, file versus block, flash technology, direct attached vs. network attached storage, and fiber channel, iSCSI connectivity.

In at least one embodiment, points may be earned for each module completed and knowledge retention from the previous module will be tested at the beginning of the next module. In some embodiments, in a first level the user novice completes "storage basics", the user may earn a "Storage Dude" badge with 10,000 points and $50 in cash. In certain embodiments, the user may also be eligible to display their progress on the "leader board" where the user may compete for industry-wide prizes, random drawings, and the chance to impress others with their talent and abilities.

In further embodiments, a next "badge" a user may earn is an understand customers and their pain points. In this embodiment, to learn this badge, the users may learn about ten or twenty of our most common customer profiles. In some embodiments, profiles may include Multi-unit retailers with 100 to 500 branch offices, 500-1000 person manufacturer, bank, insurance companies, Law office with several branch offices, etc.

In certain embodiments, videos may be used to bring the user to a real building and we meet real customers and describe their businesses. In a particular embodiment, the user may be "driven" to a company and, as the video rolls, it may be explained that the company has been in business for forty years, manufacture custom boxes for companies. In certain embodiments, the user may be shown what the manufacturing floor, owner, and IT Manager look like in addition to being shown the company's IT equipment—servers, firewall, telephone system, everything in the room.

In certain embodiments, a video may include discussions between a business owner and IT Manager about what's important to them (uptime, email, not spending money, not losing data, unable to backup etc.). In certain embodiments, there may an interactive session where the user is asked to guess what their pain points might be and they achieve points for each correct "guess." In some embodiments, after the user is presented with the video, the user may be asked what the best response to sell a product would be. In a particular embodiment, a user may complete profiles and pain point exercises to achieve a "Customer Maven" badge. In further embodiments, the user may earn an additional 1000 points for each profile or 10,000 for completing ten profiles and $75 in cash. In further embodiments, there may be a series of modules involving "role play" as the user rides shotgun (virtually attends) on a series of customer calls (based on role—sales or technical) that are interactive (i.e. "interruptible" for interactive questioning and learning during the video). In some embodiments, these modules may teach the user what customer conversations sound like and may build additional layers of knowledge that add to the learning accomplished in the pain point videos.

In certain embodiments, new customers (actors) may be in real conversations with EMC sales reps (scripted actors) and Account TC's (scripted actors). In at least some embodiments, the videos may stop at key points and query the user: "What do you do or say now"? In at least one embodiment, the user may be forced to pick the next step from a selection of next steps. In a particular embodiment the steps may be to 1) Run an assessment (correct), 2) Tell the customer that the user would like to put together a configuration and quote (wrong), 3) Ask for a tour of the plant (wrong), and 4) Ask for the order (wrong). In alternative embodiments, there may be three video modules (with ten customer conversations each) that must be completed for the user to achieve the "Talks the Talk" badge and an additional 10,000 points.

In most embodiments, if the user has completed the first three badges, the user may earn an additional $100 and may progress to a big, highly interactive, review exam that will enable the user to earn 15,000 reward points and achieve the "Ready to Roll" badge and go to the next level. In some embodiments, when the user achieves "Ready to Run" status, the user may move to the FIRST CALL LEVEL. In certain embodiments, the user may be ready to receive and work real, highly qualified sales leads from an inside sales team that match the customer profiles they have learned about. In at least some embodiments, sales leads may be distributed to the user with an explanation from the inside sales rep who qualified the lead—customer name, contact name, phone number, type of opportunity, pain points, etc. In most embodiments, the user may "accept" each lead. In most embodiments, the user may be warned that the user may need to move each one through the process (first call, assessment, proposed solution design, config, quote, final proposal, order) to achieve additional points and rewards.

In certain embodiments, if the user needs help, the user may reach out to chat with a "game master" from who may answer questions and provide real-time assistance and support. In most embodiments, these interactions may lead to achieving the "Meeting Prep" badge (tips for getting the appointment, first call preparation, additional qualification during the phone call, "Appointment Secured" (enter date), First Call" (setting the table) and Next Step (assessment, etc.). In most embodiments, points and cash may be achieved with each badge.

In further embodiments, the current disclosure may enable building a virtual world such as a virtual EMC—In most embodiments, this may enable a dynamic, engaging, and virtual learning environment ("Partner World") that may be more effective and take less time to ramp partner resources. In certain embodiments, using video game mechanics (badges, leveling up, digital identity, leader boards, intense competition, collaboration, virtual mentors, etc.), partners may learn the "Company Way" of selling in a completely new, interactive, and exciting environment.

In certain embodiments, the current disclosure may enable creation of a virtual corporation. In some embodiments, a user may be guided through virtual story where the user is the protagonist. In an embodiment, the current disclosure may enable simulated selling of one or more business products. In further embodiments, the current disclosure, through a virtual environment, may enable spatial representation of logical concepts. In further embodiments, the current disclosure may enable overlay of logical concepts onto spatial concepts to enable effective retention of concepts of ideas. In certain embodiments, business experts, such as EMC experts, may act as super users in the game providing training and leadership. In other embodiments, visual cues may ensure progress. In some embodiments, there may be an option for textual chat or interaction with others within the virtual world. In some embodiments, in response to a request for help a super user may teleport into the world.

In an embodiment the game interface may include 3D special abstraction. In another embodiment, 3D models may provide a teaching tool. In a further embodiment, a user may interact with a 3D model. In still further embodiments, the characteristics of a product, such as hard drive performance, constraints, power usage, data workload skew, and/or FAST tiering process. In certain embodiments, may include a Game Interface and a 3D Spatial Abstraction.

In certain embodiments, large, open, logical data centers may be lesson subjects. In some embodiments, data flow may be animated in a "fluid-dynamics" style. In certain embodiments, the different between the front-office, back-office, data center may be logically highlighted. In further embodiments animations, and path control may be transitioned to guide experience.

In further embodiments, products of a company, such as EMC, may be blown up in a virtual environment to provide physical tours of the hardware, animate, annotate software operation, and animate, annotate where data flows. In some embodiments, the interactive game may be driven by a Game Engine with live 3D multi-user interaction. In further embodiments, the current disclosure may leverage technology to make partner interaction more human. In still further embodiments, avatars may be used to project personality of partners/roles. In an embodiment there may be partner avatars for sales and technical personal. In another embodiment there may be Expert Company Avatars.

In certain embodiments, there may be a Massively Multi-user Online (MMO) Game Engine. In other embodiments, partners may visit persistent, online learning spaces. In further embodiments, partners may attend alone, or as a group. In alternative embodiments, Company staff may act as "Game Masters" (GMs). In some embodiments, GMs may assist struggling students. In other embodiments, GMs may host events, instructor-led training options. In further embodiments, GMs may Re-Define the OILT format.

In certain embodiments, there may be a Game Engine with automated learning and human supported content driven by scripted "Non-Player Characters." In some embodiments, there may be a voiced narrative recommended for fluency of immersion. In most embodiments, the interactions may be fir to a game scenario. In other embodiments, the interactions may coach and provide a drill sergeant and a tour captain.

In further embodiments, there may be voice integrated chat. In certain embodiments, there may be a series of Achievements, Measures, & Continuous Rewards. In other embodiments, there may be multiple layers such as in-lesson progress tracking, lesson Rewards: achievements, and lesson completion towards cumulative completion awards. In further embodiments, there may be inline testing.

In some embodiments, competency testing may be integrated into game scripts. In certain embodiments, this may reinforces self-paced approach, allowing more practice in areas of difficulty. In further embodiments, experts may be allowed to "test past" remedial content. In at least some embodiments, multiple levels of questions/content may be necessary. In at least one embodiment, there may be rolled-up achievements. In certain embodiments, students may not be alone. In further embodiments, students may be roll-up under a "group." In an embodiment, a group may have attributes and achievements, much like individual students. In other embodiments, partners may aggregate awards through members' accomplishments. In certain embodiments, partners may have a dedicated, common space to showcase awards.

In a particular embodiment, an outdoor city block may be a stage for content. In some embodiments, or a business may be at one end of the road and a partner building may be on the other end of the road. In further embodiments, lessons may be buildings on the way to reach the Company or business building.

In a particular embodiment, there may be interaction about storage basics. In certain embodiments, this may provide a virtual tour about the "History of Storage" model as a museum tour. In some embodiments, this may be a 30's-style history of the data center. In other embodiments, a Company's products may be placed into a working business model.

In another embodiment, a building may be a messaging building. In certain embodiments, this building may provide the opportunity to build business-relevant context in messaging conversations. In some embodiments, business challenges, and common infrastructures may be built diagrammatically. In other embodiments, a story may be designed around a company's, such as EMC's, approach towards these markets.

In most embodiments, each scenario may be explored interactively. In other embodiments, there may be a "Virtual partner block." In certain embodiments, there may be a business for each tier shown as neighbors. In some embodiments, there may be velocity services program graphics.

In other embodiments, a player or user may be introduced to a visually-represented functioning business. In some embodiments, the challenges of the business may be highlighted. In most embodiments, inspection triggers may be enabled allowing the user to learn more details about the business.

In another embodiment, there may be a building called Deduplication. In certain embodiments this may be located on the section on "backup to disk" in the Business Drivers VAEC course. In some embodiments, progressing through this building may enable the user to earn a "Dedupe Badge." In some embodiments, this building may provide visualized and animated examples of the deduplication process.

In a further embodiment, there may be a product introduction building. In this embodiment, a "larger than life" representation of a company's products, such as EMC's products, may be presented to the user. In some embodiments, the larger than life display may enable the user to learn the ins and outs of the products. In further embodiments, product tours may be encapsulated in a story line. In still further embodiments, there may be models with progressive knowledge check points. In other embodiments, there may be question and answer segments where the user identifies components and functions of the components. In another embodiment, there may be a services building. In an embodiment, the services building may be used to show the services a business, such as EMC, has. In further embodiments, there may be buildings for each type of learning that the user needs to complete.

In some embodiments there may be a storage basics module or building. In certain embodiments, there may be a messaging module or building. In other embodiments, there may be a business drivers building or module. In a particular embodiment, there may be a product integration building or module. In a further embodiment, there may be a services module or building. In another embodiment, there may be a leads module or building. In yet another embodiment, there may be a configuration module or building. In still another embodiment, there may be a quotation module or building. In a further embodiment, there may be a tools module or building. In an embodiment, there may be an assessments module or building.

Figure 2:
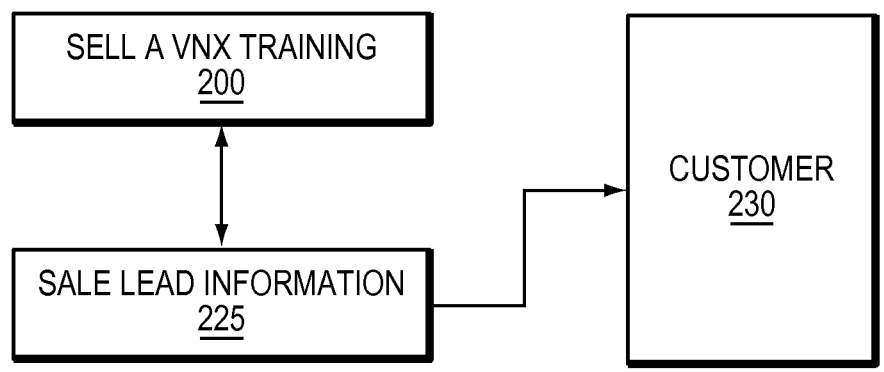
FIG. 2 is a simplified illustration of interactions between interactive training, sales leads, and a customer, in accordance with an embodiment of the present disclosure.

Refer now to the example embodiments of FIGS. 1 and 2. In the example embodiment of FIGS. 1 and 2, a sample game set is outlined. A sell a Product, such as VNX, training 200 is chosen (step 100). Interaction points are chosen as sales lead information 225 (Step 105) to lead to interaction with customer 230. A determination is made on how to integrate the data from the interaction point is made (step 110).

Figure 3:
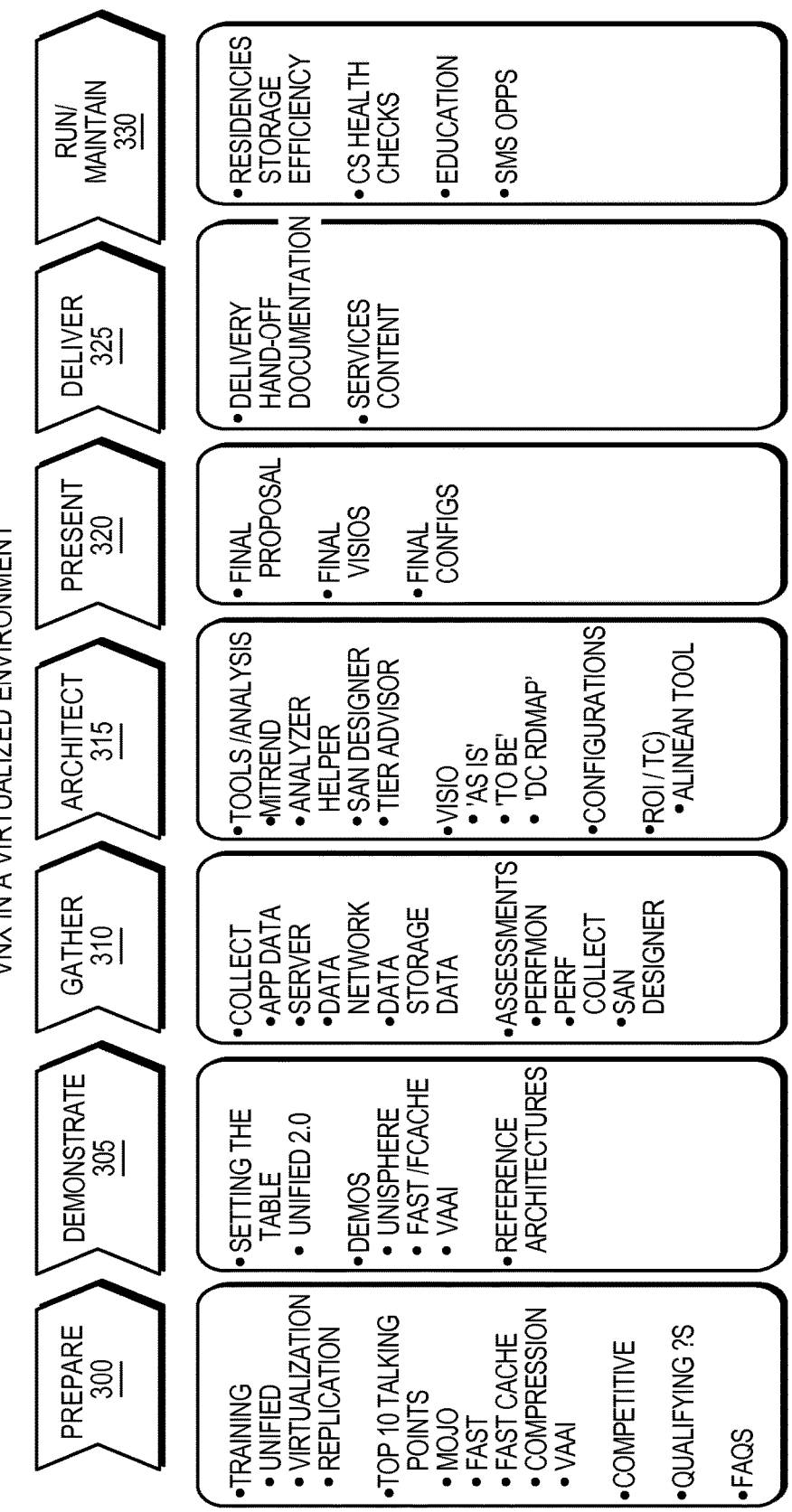
FIG. 3 is a simplified illustration of the outline for virtualized product training, in accordance with an embodiment of the present disclosure.

Refer now to the example embodiment of FIG. 3. The example embodiment of FIG. 3, represents a sample illustration of creating Sell a Product, such as VNX, training 200 of FIG. 2. In this embodiment, creating selling a VNC in a virtualized environment has seven steps. There is the prepare step 300, which integrates information for the learning. There is demonstrate 305, which includes demos. There is gather 310, which includes assessments. There is architect 315, which includes configuration and tools. There is a present step 320, which includes the final set-up for the training. There is a deliver step 325, which includes delivery of the training. There is a run/maintain step 330, which pertains to the day to day presentation of the training.

Figure 4:
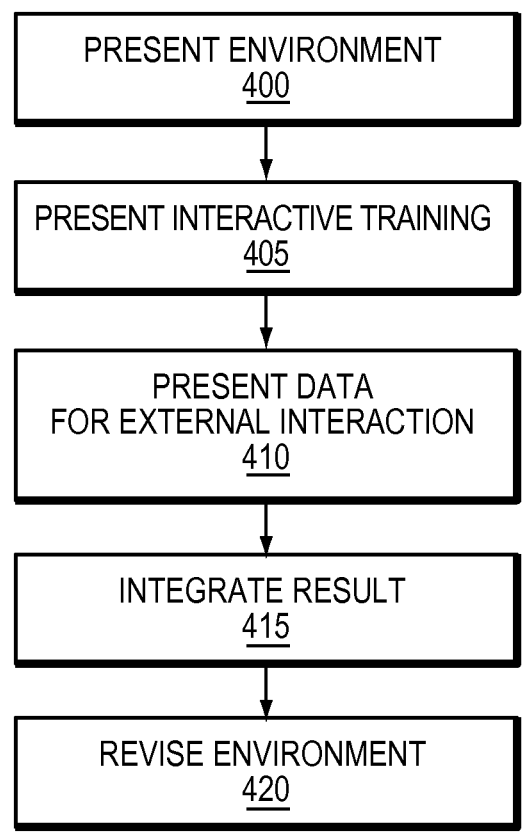
FIG. 4 is a simplified example of a method using interactive training with a user, in accordance with an embodiment of the present disclosure.
Figure 5:
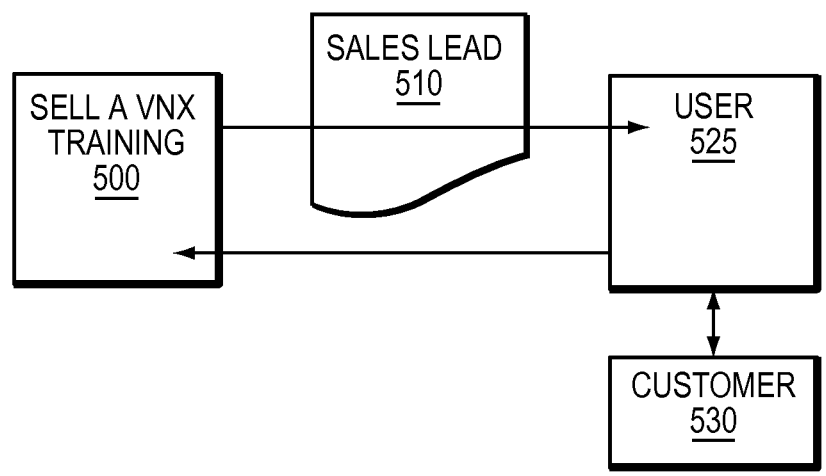
FIG. 5 is a simplified illustration of interactions between a user, interactive training, sales leads, and a customer, in accordance with an embodiment of the present disclosure.

Refer now to the example embodiments of FIGS. 4 and 5, which illustrate a simplified interaction between a user and the training. User 525 is presented with the environment 500. User 525 interacts with the environment 500 to receive training (step 405). User 525 is presented with external data, sales lead 510, to use to try and sell information to customer 530 outside of the training environment 500 (step 410). The result of the interaction user 525 and customer 530 are integrated into environment 500 (step 415). Environment 500 and the training are revised based on the interaction (step 420).

Figure 6:
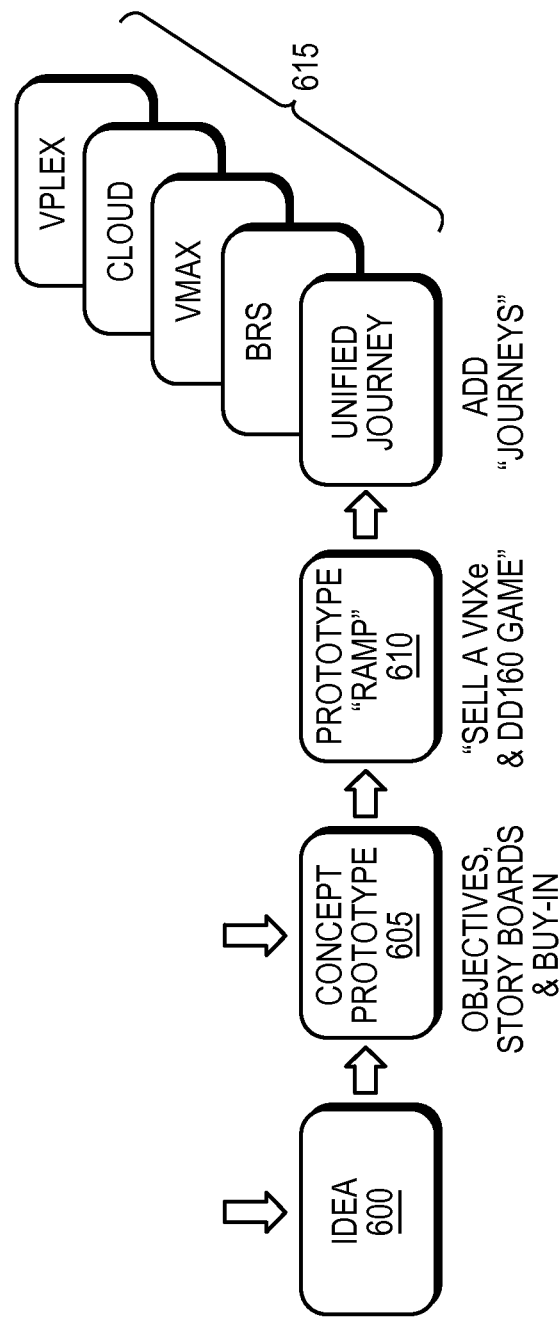
FIG. 6 is a simplified illustration of a process flow for setting up interactive virtualized training, in accordance with an embodiment of the present disclosure.
Figure 7:
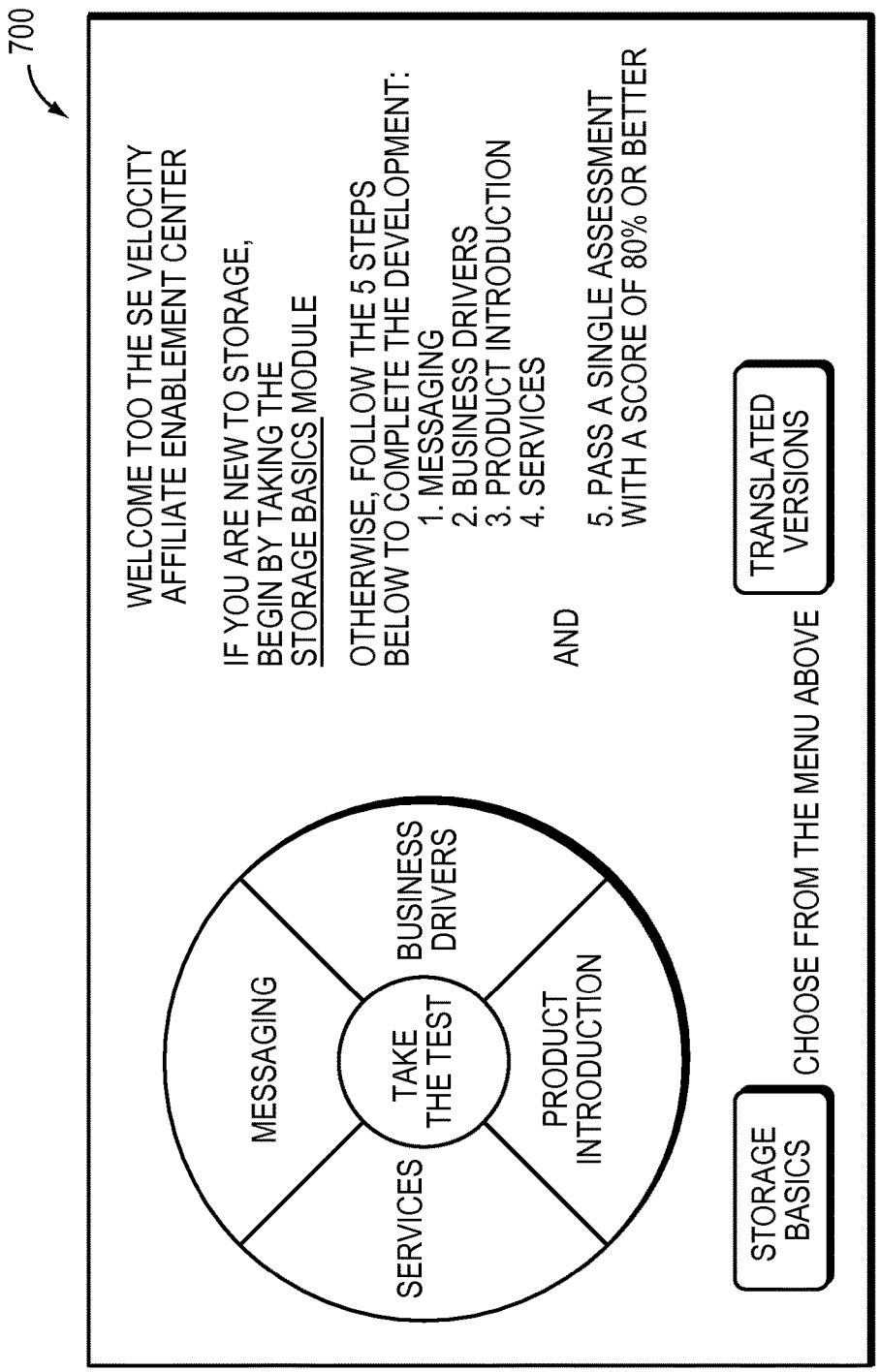
FIG. 7 is a simplified mock-up of an interface for virtualized interactive training presented to a user, in accordance with an embodiment of the present disclosure.

Refer now to the example embodiment of FIG. 6, which illustrates an alternative embodiment of defining a game. Idea 600 is worked into a concept or prototype (605). Prototype 605 is ramped into a game 610. Modules 615 are added to the game. Refer now to the example embodiment of FIG. 7, which illustrates a sample mark-up of a screen that may be presented to users of the training. Mark-up 700 shows sample interactions that a user may take to interact with the training. For example, the user may take the storage basics course. The user may also take tests or take messaging, business driver, product information, or services training.

Figure 8:
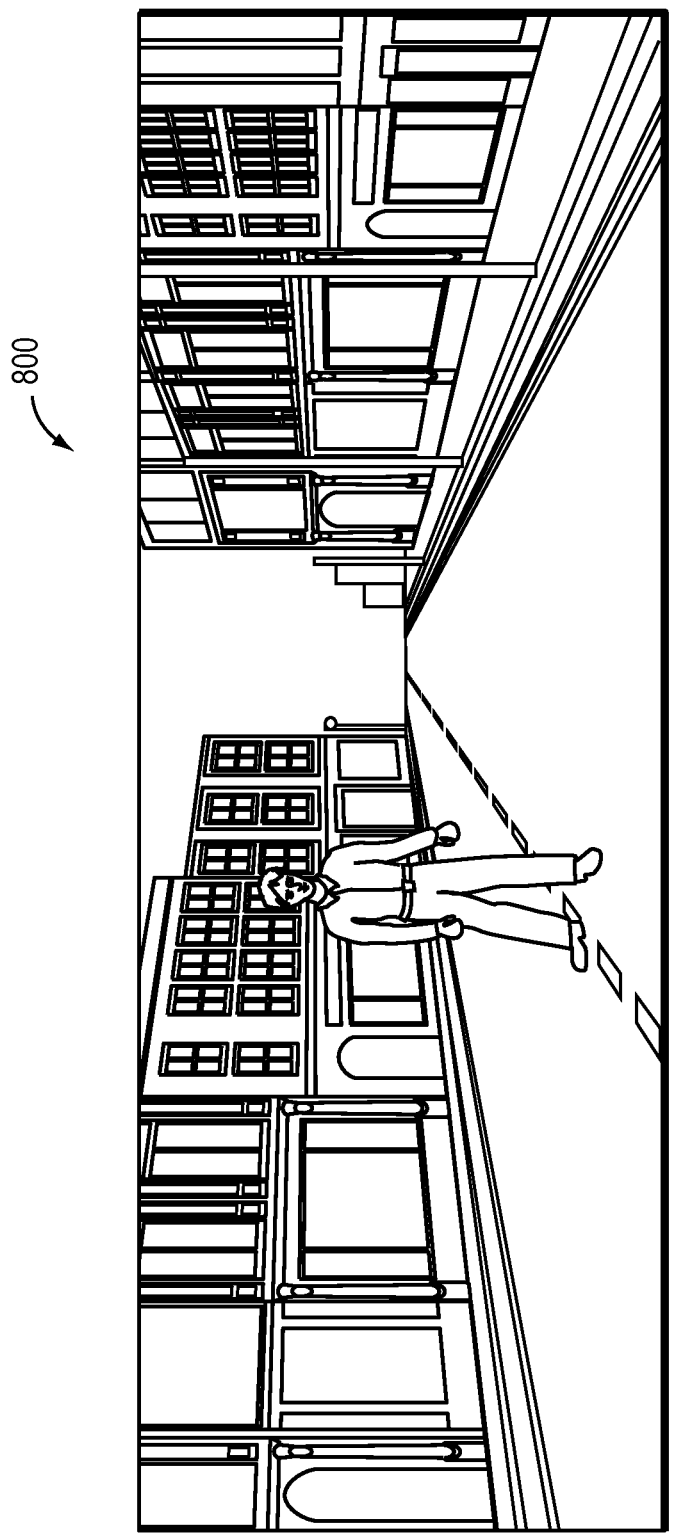
FIG. 8 is an alternative simplified mock-up of an interface for virtualized interactive training presented to a user, in accordance with an embodiment of the present disclosure.

Refer now to the example embodiment of FIG. 8, which illustrates an alternative mark-up of a user interacting with the training. In this embodiment the user is presented as an avatar on a street. The user may interact with the buildings on the street which represent different training modules.

Figure 9:
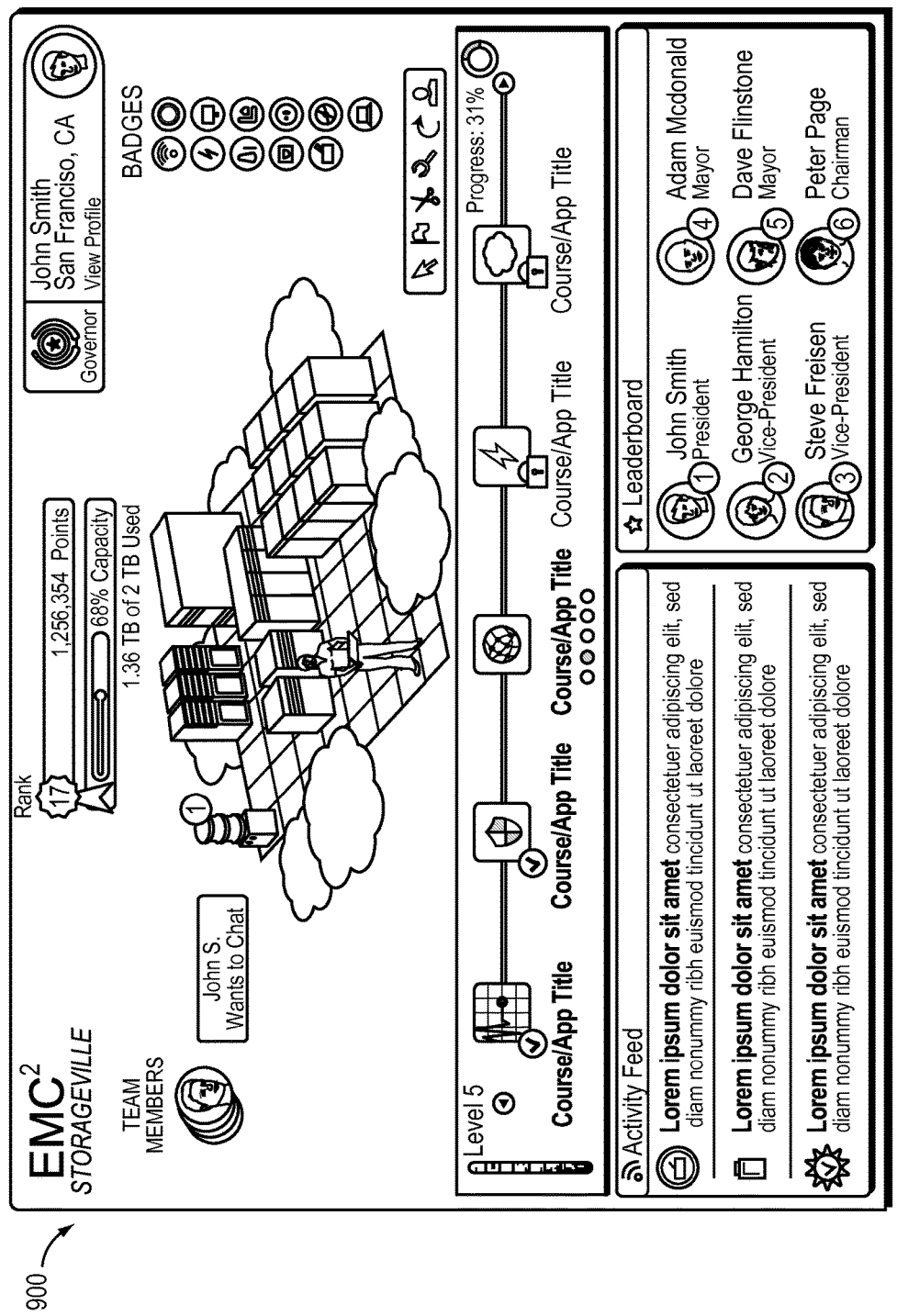
FIG. 9 is a further simplified mock-up of an interface for virtualized interactive training presented to a user, in accordance with an embodiment of the present disclosure.

Refer now to the example embodiment of FIG. 9, which illustrates a further markup of a user interacting with the game. In this embodiment, a user is interacting with several different storage products, such as EMC storage products. In this embodiment, there is also feedback to the user in terms of a score and the number of badges the user has won. There is also a leader board showing the other user against which the current user is competing.

Figure 10:
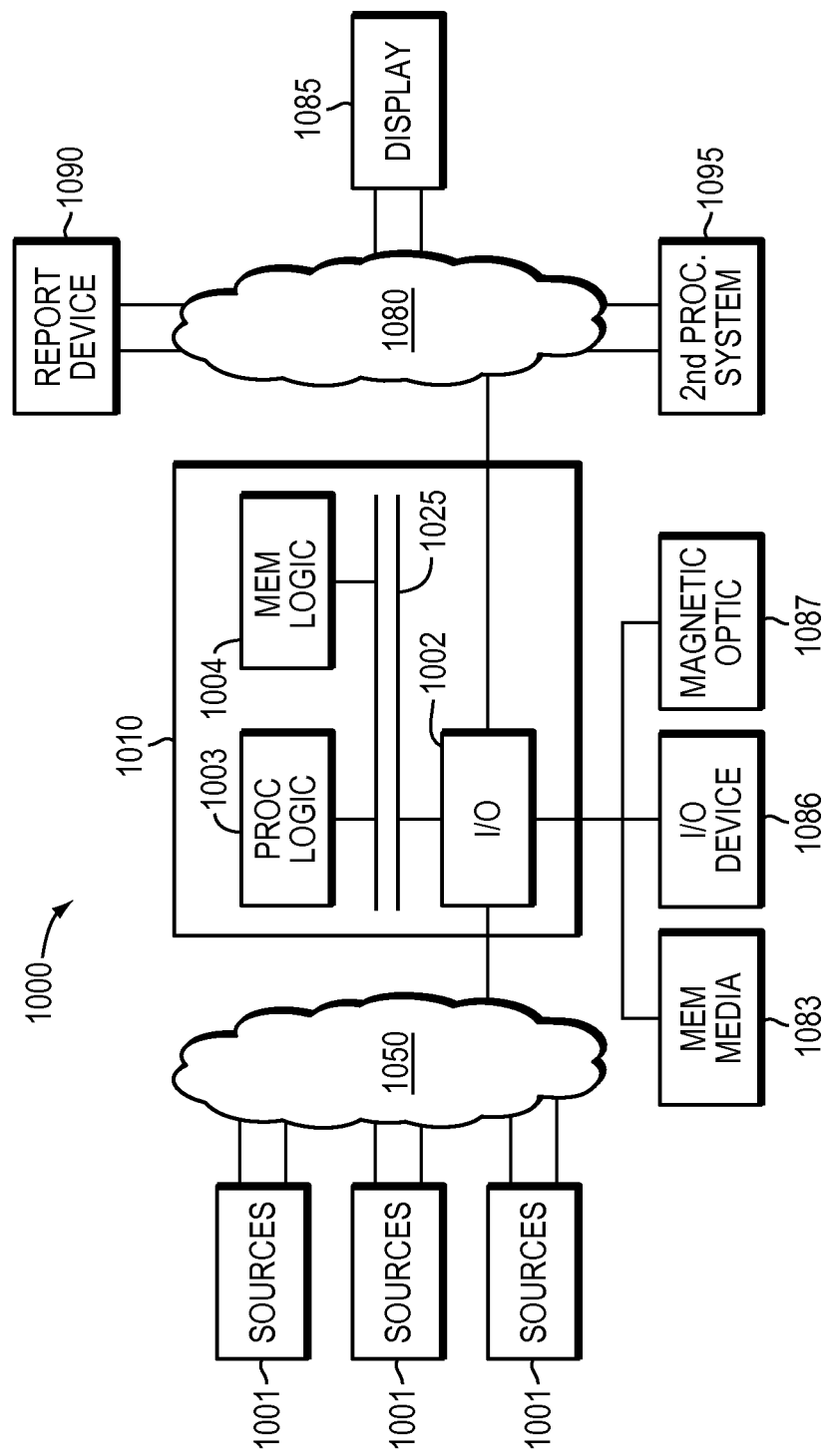
FIG. 10 is an example of an embodiment of an apparatus that may utilize the techniques described herein, in accordance with an embodiment of the present disclosure.
Figure 11:
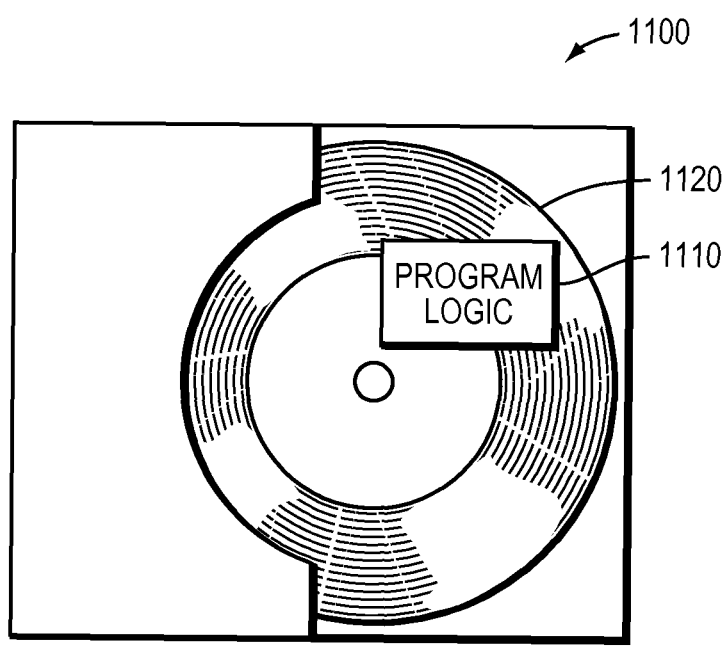
FIG. 11 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 10, the machine becomes an apparatus for practicing the invention. When implemented on one or more general-purpose processors, the program code combines with such a processor 1003 to provide a unique apparatus that operates analogously to specific logic circuits. As such a general purpose digital machine can be transformed into a special purpose digital machine. FIG. 11 shows Program Logic 1034 embodied on a computer-readable medium 1130 as shown, and wherein the Logic is encoded in computer-executable code configured for carrying out the reservation service process of this invention and thereby forming a Computer Program Product 1100. The logic 1134 may be the same logic 1040 on memory 1004 loaded on processor 1003. The program logic may also be embodied in software modules, as modules, or as hardware modules. The processors or machines may be embodied as one or more virtual processors or machines, respectively.

The logic for carrying out the method may be embodied as part of the system described below, which is useful for carrying out a method described with reference to embodiments shown in, for example, FIGS. 1 and 4. For purposes of illustrating the present invention, the invention is described as embodied in a specific configuration and using special logical arrangements, but one skilled in the art will appreciate that the device is not limited to the specific configuration but rather only by the claims included with this specification.

What is claimed is:

1. A computer implemented method of training users utilizing a computer simulation system, including one or more processors, enabled to interact with non-simulation users, the computer implemented method comprising:
   presenting, using the computer simulation system, a user with training about business processes via an interactive environment,
   wherein the interactive environment is implemented on the one or more processors,
   wherein the interactive environment is enabled to be implemented using 3D modelling of the interactive environment;
   enabling the user to interact with one or more data storage products through the computer simulation system;
   having the user perform the training by interacting with the one or more data storage products, wherein the interactive environment combines training presented in a virtual world or a game to facilitate using the training to perform actions outside of the training environment including making sales, and the interactive environment presents the user with learning opportunities and information that are be used outside the learning environment to perform business related tasks;
   wherein the interactive environment retrieves previous customer interactions;
   providing the user with a sales lead; wherein the sales lead leverages the training and provides details about a customer and what products fit a customer profile associated with the customer;
   having the user try to sell the one or more data storage products to the customer, outside of the interactive environment;
   integrating the result of the user trying to sell the one or more data storage products to the customer outside of the interactive environment into the interactive environment; and
   revising the interactive environment based on the success or failure of the sale of the one or more data storage products to the customer.

2. The method of claim 1 wherein the training comprises: presenting the user with information about a product; and testing the user on the information presented about the product.

3. The method of claim 2 further comprising:
   determining the user's knowledge of the product based on the testing; and
   awarding the user points based on the user's knowledge.

4. The method of claim 1 wherein the interactive environment consists of training modules; wherein each training module presents information about a specific product.

5. The method of claim 4 wherein the interactive training environment appears as a street to the user and each training module of the training modules appears as a building.

6. A system comprising:
   a computer simulation system, including one or more processors, including a visual display enabled to display an interactive environment;
   a user interface enabled to communicate with the computer simulation system; and
   computer-executable logic operating in memory, wherein the computer-executable program logic is configured to enable the one or more processors to execute:
   presenting, using the computer simulation system, a user with training about business processes via the interactive environment, wherein the interactive environment is implemented on the one or more processors, wherein the interactive environment is implemented using 3D modelling of the interactive environment;
   enabling the user to interact with one or more data storage products through the computer simulation system;
   having the user perform the training by interacting with the one or more data storage products, herein the interactive environment combines training presented in a virtual world or a game to facilitate using the training to perform actions outside of the training environment including making sales, and the interactive environment presents the user with learning opportunities and information that are be used outside the learning environment to perform business related tasks;
   wherein the interactive environment retrieves previous customer interactions;
   providing the user with a sales lead; wherein the sales lead leverages the training and provides details about a customer and what products fit a customer profile associated with the customer;
   having the user try to sell one or more data storage products to the customer, outside of the interactive environment;
   integrating the result of the user trying to sell the one or more data storage products to the customer outside of the interactive environment into the interactive environment; and revising the interactive environment based on the success or failure of the sale of the one or more data storage products to the customer.

7. The system of claim 6 wherein the training comprises:
presenting the user with information about a product; and
testing the user on the information presented about the product.

8. The system of claim 7 wherein the computer executable logic is further configured to enable execution of:
determining the user's knowledge of the product based on the testing; and
awarding the user points based on the user's knowledge.

9. The system of claim 6 wherein the interactive environment consists of training modules; wherein each training module presents information about a specific product.

10. The system of claim 9 wherein the interactive training environment appears as a street to the user and each training module of the training modules appears as a building.

11. A computer program product for training users utilizing a computer simulation system, including one or more processors, enabled to interact with non-simulation users, the computer program product-comprising:
a non-transitory computer readable medium encoded with computer executable program code for replication of data, the code configured to enable the execution of:
presenting, using the computer simulation system, a user with training about business processes via an interactive environment, wherein the interactive environment is implemented on the one or more processors, wherein the interactive environment is implemented using 3D modelling of the interactive environment;
enabling the user to interact with one or more data storage products through the computer simulation system;
having the user perform the training by interacting with the one or more data storage products, wherein the interactive environment combines training presented in a virtual world or a game to facilitate using the training to perform actions outside of the training environment including making sales, and the interactive environment presents the user with learning opportunities and information that are be used outside the learning environment to perform business related tasks; wherein the interactive environment retrieves previous customer interactions;
providing the user with a sales lead; wherein the sales lead leverages the training and provides details about a customer and what products fit a customer profile associated with the customer;
having the user try to sell one or more data storage products to the customer, outside of the interactive environment;
integrating the result of the user trying to sell the one or more data storage products to the customer outside of the interactive environment into the interactive environment; and
revising the interactive environment based on the success or failure of the sale of the one or more data storage products to the customer.

12. The computer program product of claim 11 wherein the training comprises:
presenting the user with information about a product; and
testing the user on the information presented about the product.

13. The computer program product of claim 12 wherein the computer code is further enabled for:
determining the user's knowledge of the product based on the testing; and
awarding the user points based on the user's knowledge.

14. The computer program product of claim 12 wherein the interactive environment consists of training modules; wherein each training module presents information about a specific product.

15. The computer program product of claim 14 wherein the interactive training environment appears as a street to the user and each training module of the training modules appears as a building.

* * * * *